(12) United States Patent
Chen

(10) Patent No.: US 6,976,756 B1
(45) Date of Patent: Dec. 20, 2005

(54) NOSE PAD FOR GOGGLES OR EYEGLASSES

(76) Inventor: Chih-Ming Chen, No. 19, Alley 4, Lane 243, Sec. 5, Her-Wei Road, Tainan City (TW)

(*) Notice: Subject to any disclaimer, the term of this patent is extended or adjusted under 35 U.S.C. 154(b) by 30 days.

(21) Appl. No.: 10/917,464

(22) Filed: Aug. 13, 2004

(51) Int. Cl.⁷ .............................................. G02C 5/12
(52) U.S. Cl. ........................ 351/136; 351/82; 351/138
(58) Field of Search ................... 351/78–82, 136–139

(56) References Cited

U.S. PATENT DOCUMENTS 2,023,469 A * 12/1935 Grier ........................... 351/82
5,771,087 A * 6/1998 Martin et al. ............... 351/136
6,386,705 B1 * 5/2002 Chen ........................... 351/138

* cited by examiner

*Primary Examiner*—Huy Mai
(74) *Attorney, Agent, or Firm*—Rosenberg, Klein & Lee

(57) ABSTRACT

A nose pad is mounted to an inner side of an intermediate section of a frame of a pair of goggles or eyeglasses. The nose pad includes a perimeter wall extending along a perimeter thereof. The perimeter wall extends forward to define a recessed portion for receiving air, providing an air cushioning effect, providing the frame with buoyancy, and providing improved wearing comfort.

9 Claims, 6 Drawing Sheets

NOSE PAD FOR GOGGLES OR EYEGLASSES

BACKGROUND OF THE INVENTION

1. Field of the Invention

The present invention relates to a nose pad for goggles, eyeglasses, or the like.

2. Description of the Related Art

A typical pair of goggles or eyeglasses includes one or two nose pads attached to the frame for preventing injury to the nose of the wearer when the frame is subjected to an impact. The nose pads are generally made of an elastomeric material, such as rubber. However, the impact-absorbing effect of the conventional nose pads was found dissatisfactory, as the nose pads are solid. Further, the goggles or eyeglasses are apt to fall from face of the wearer and lost in the water when the wearer is proceeding with water activities such as fishing, swimming, diving, water volley ball, surfing, water motorcycling, water ballet, etc.

SUMMARY OF THE INVENTION

An objective of the present invention is to provide a nose pad for a pair of goggles or eyeglasses with improved impact-absorbing effect.

Another objective of the present invention is to provide a nose pad pair for a pair of goggles or eyeglasses, providing the pair of goggles or eyeglasses with buoyancy.

A further objective of the present invention is to provide a pair of goggles or eyeglasses with a nose pad to provide an air-cushioning effect.

Still another objective of the present invention is to provide a pair of goggles or eyeglasses with a buoyant nose pad, preventing loss of the goggles or eyeglasses when the wearer is taking water activities.

In accordance with an aspect of the invention, a nose pad is mounted to an inner side of an intermediate section of a frame of a pair of goggles or eyeglasses. The nose pad comprises a perimeter wall extending along a perimeter thereof. The perimeter wall extends forward to define a recessed portion for receiving air.

The recessed portion includes an opening facing forward. In an embodiment of the invention, a film is adhered to a front side of the nose pad to seal the recessed portion. In another embodiment of the invention, the nose pad includes a lengthened top side.

In accordance with another aspect of the invention, a pair of goggles comprises a frame and a nose pad attached to an inner side of an intermediate section of a frame. The nose pad comprises a perimeter wall extending along a perimeter thereof. The perimeter wall extends forward to define a recessed portion for receiving air.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
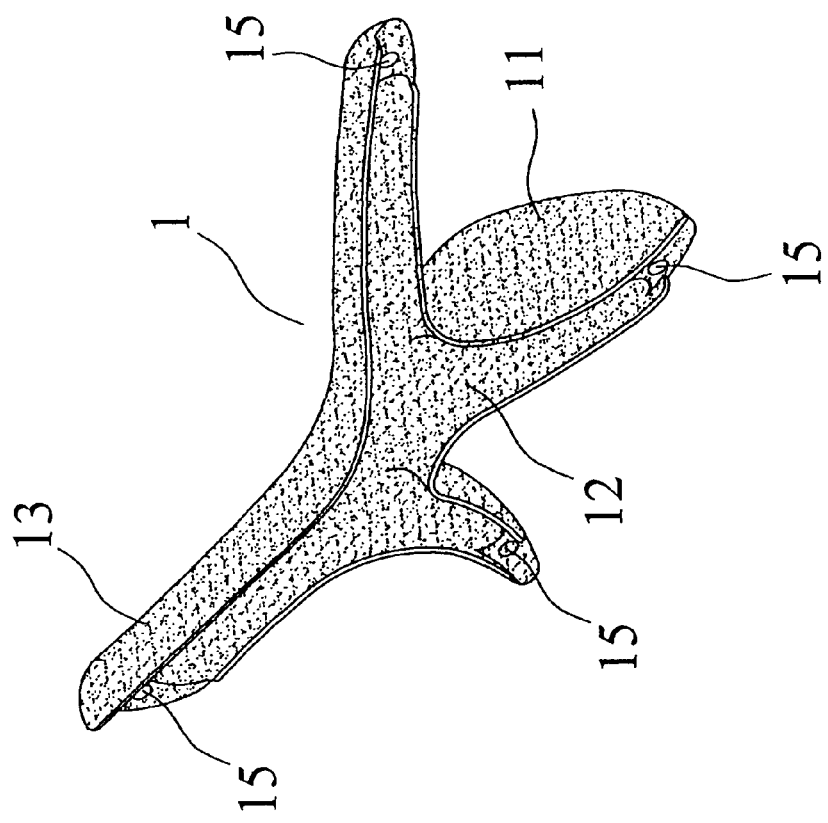
FIG. 1 is a perspective view of a nose pad for a pair of goggles or eyeglasses in accordance with the present invention.
Figure 2:
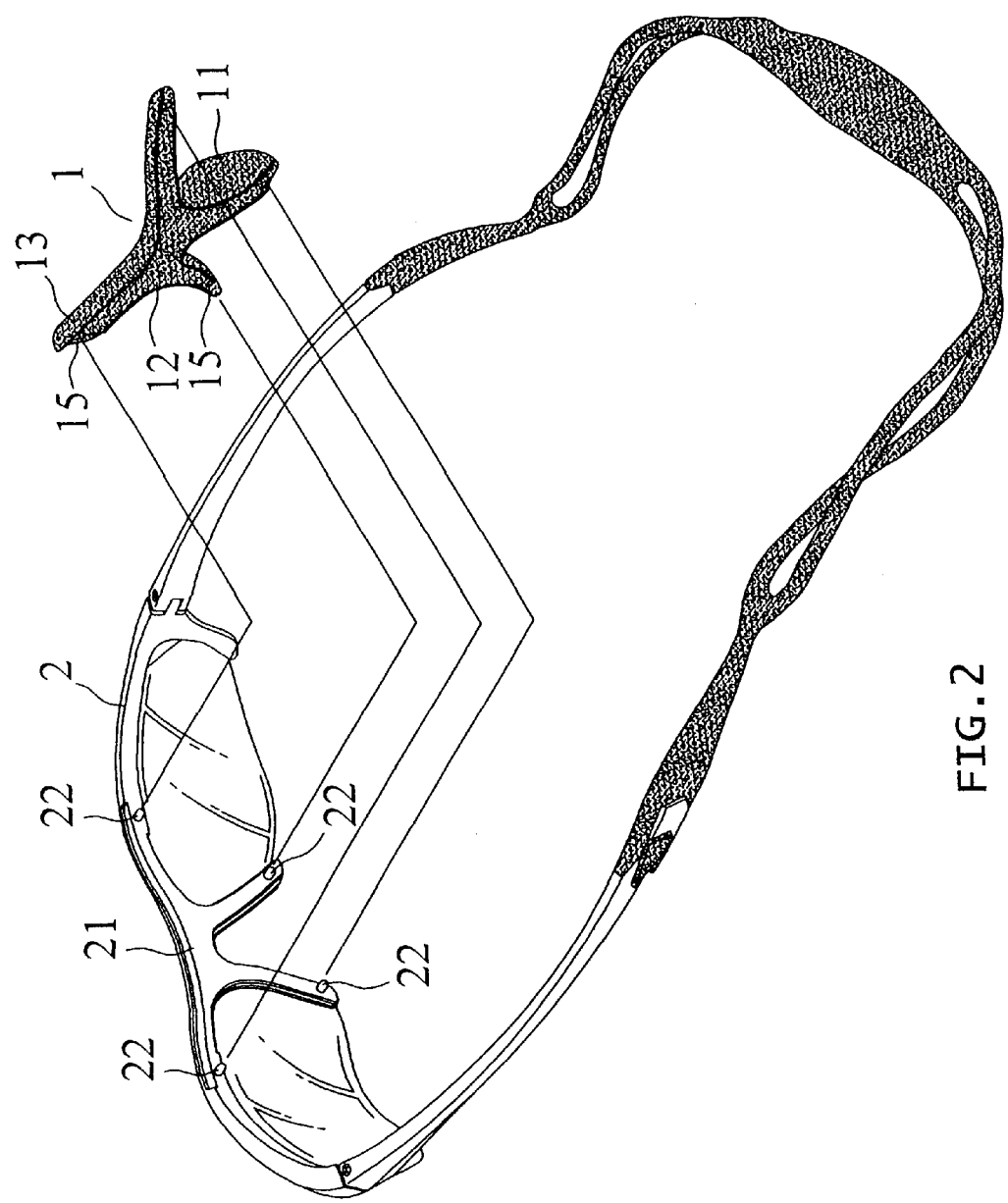
FIG. 2 is a perspective view, partly exploded, of a pair of goggles with the nose pad in FIG. 1.

Referring to FIG. 1, a nose pad for a pair of goggles or eyeglasses in accordance with the present invention is substantially π-shaped and comprises a plurality of engaging holes 15 in a front side thereof for engaging with a plurality of pegs 22 formed on an inner side of an intermediate section 21 of a frame 2 of a pair of goggles, as shown in FIG. 2. The nose pad 1 may include a lengthened top side 13 to increase the impact-absorbing area.

Figure 3:
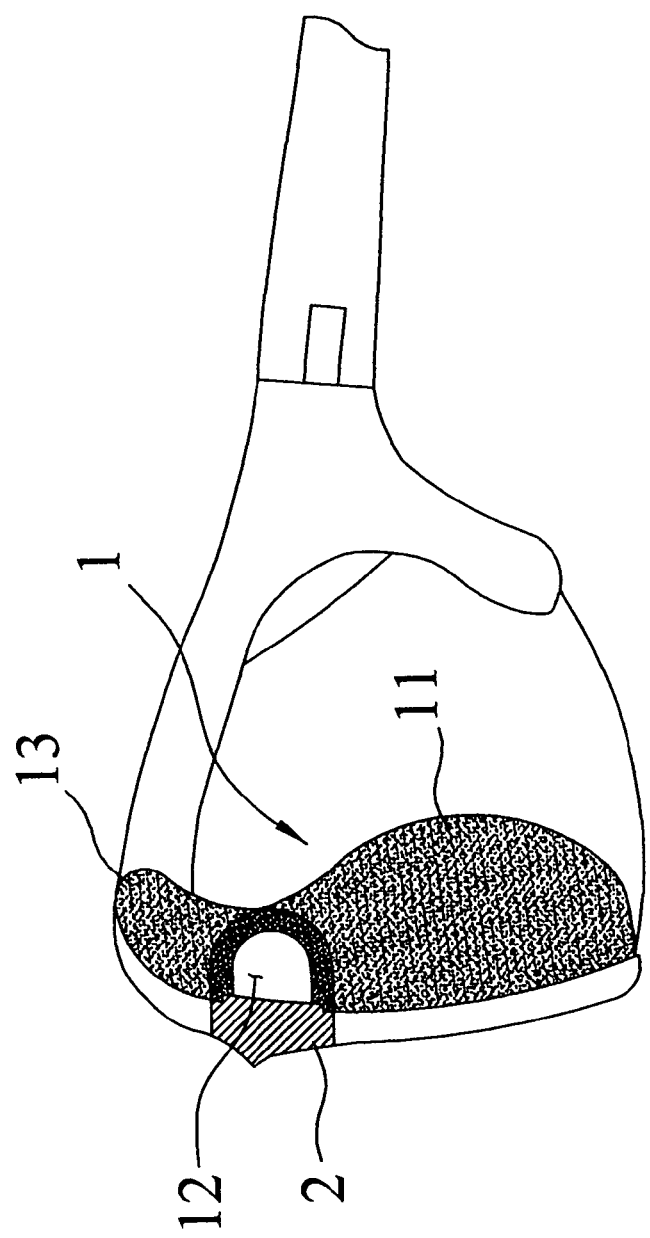
FIG. 3 is a sectional view of the pair of goggles in FIG. 2 in accordance with the present invention.
Figure 4:
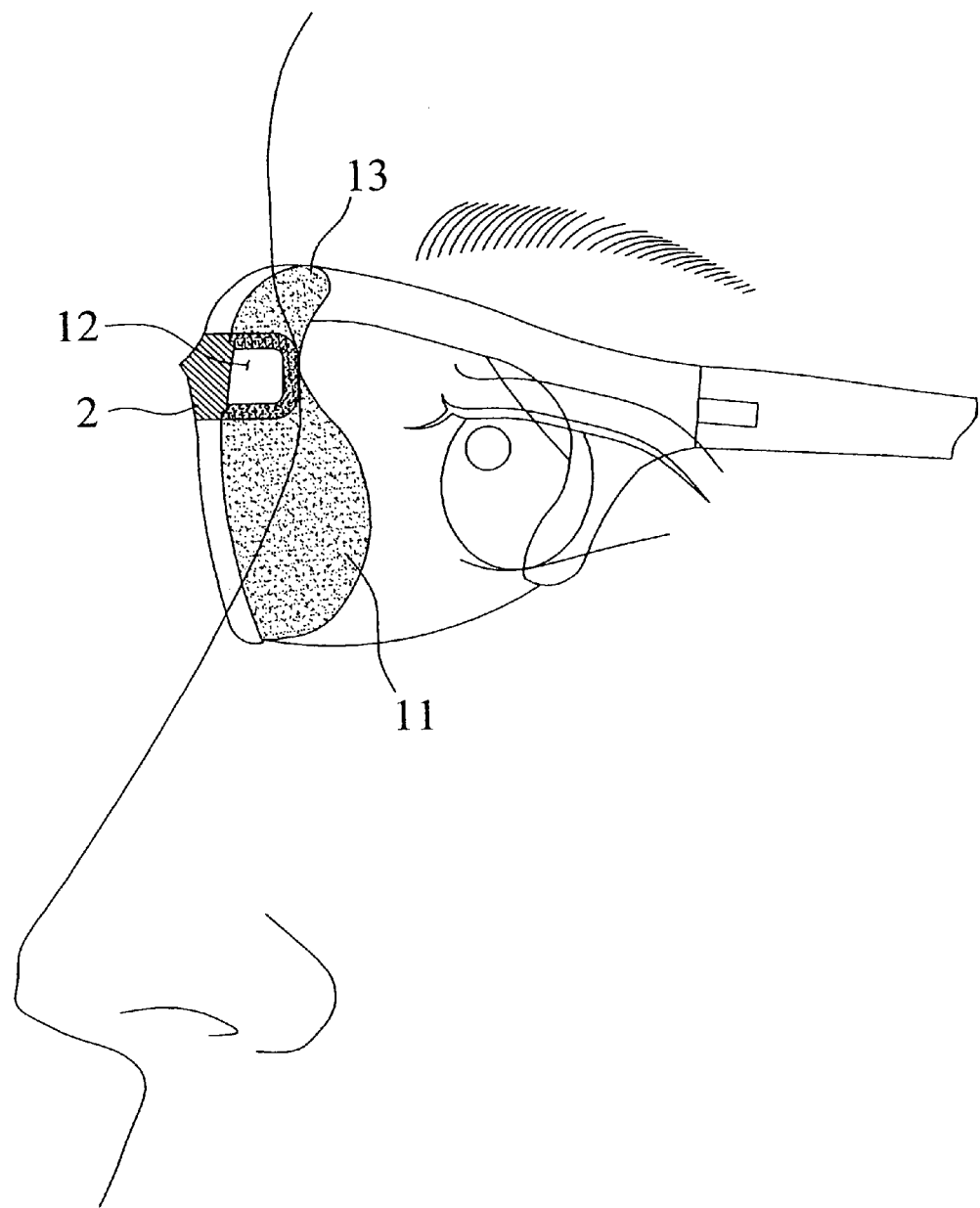
FIG. 4 is a sectional view similar to FIG. 3, illustrating use of the nose pad.

The nose pad 1 includes a perimeter wall 11 extending along a perimeter of the nose pad 1. The perimeter 11 extends forward to define a recessed portion 12 for receiving air, providing an air-cushioning effect. The recessed portion 12 includes an opening that faces forward. As illustrated in FIGS. 3 and 4, when the nose pad 1 is attached to the inner side of the intermediate section 21 of the frame 2 of the pair of goggles, the recessed portion 12 is sealed by the frame 2. When the pair of goggles is subjected to an impact, the air in the recessed portion 12 provides a cushioning effect to prevent injury to the wearer's nose.

Figure 5:
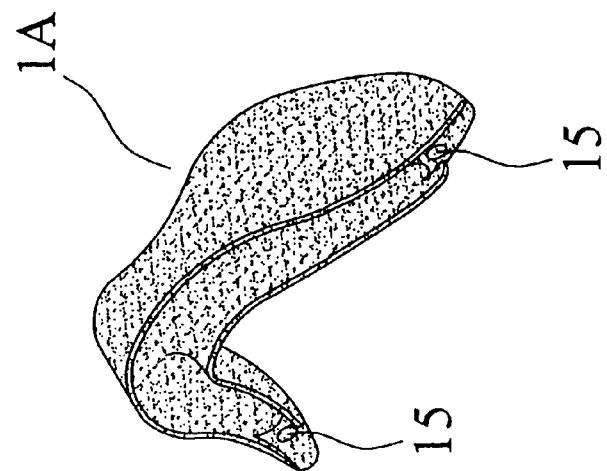
FIG. 5 is a perspective view of a modified embodiment of the nose pad in accordance with the present invention.
Figure 6:
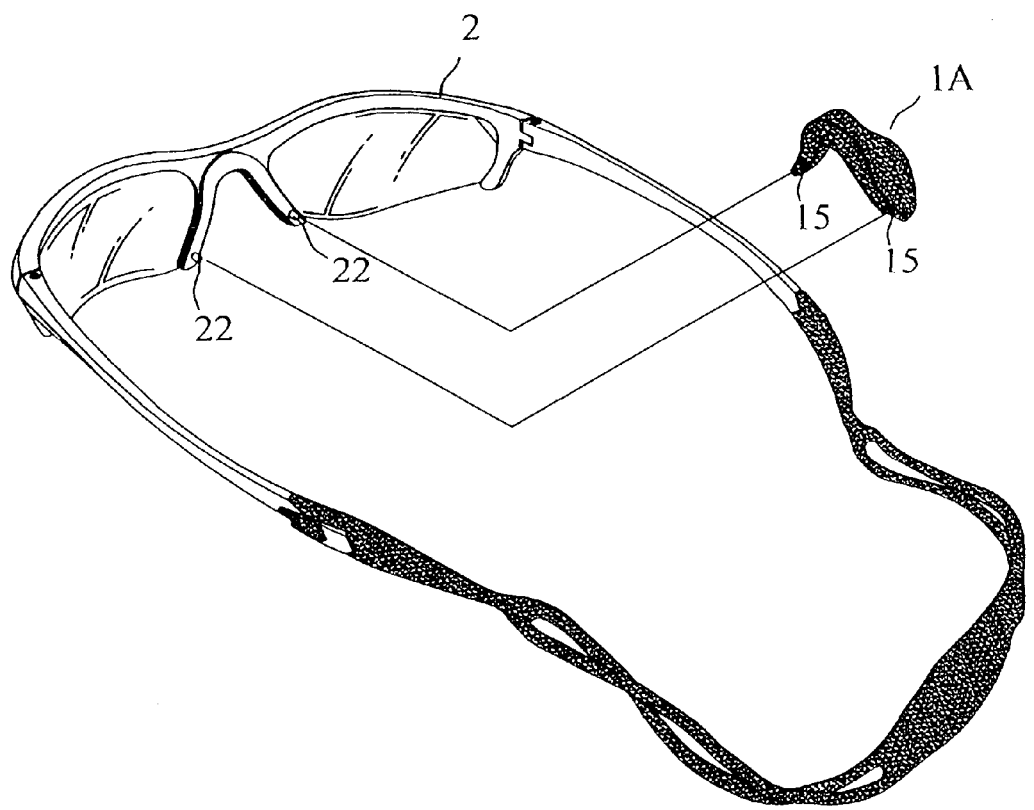
FIG. 6 is a perspective view, partly exploded, of a pair of goggles with the nose pad in FIG. 5.

FIG. 5 illustrates a modified embodiment of the nose pad. In this embodiment, the nose pad 1A is substantially inverted V-shaped and includes two engaging holes 15 that are engaged with two pegs 22 on the frame 2 of the pair of goggles, as shown in FIG. 6. The lengthened top side 13 in the first embodiment is omitted.

Figure 7:
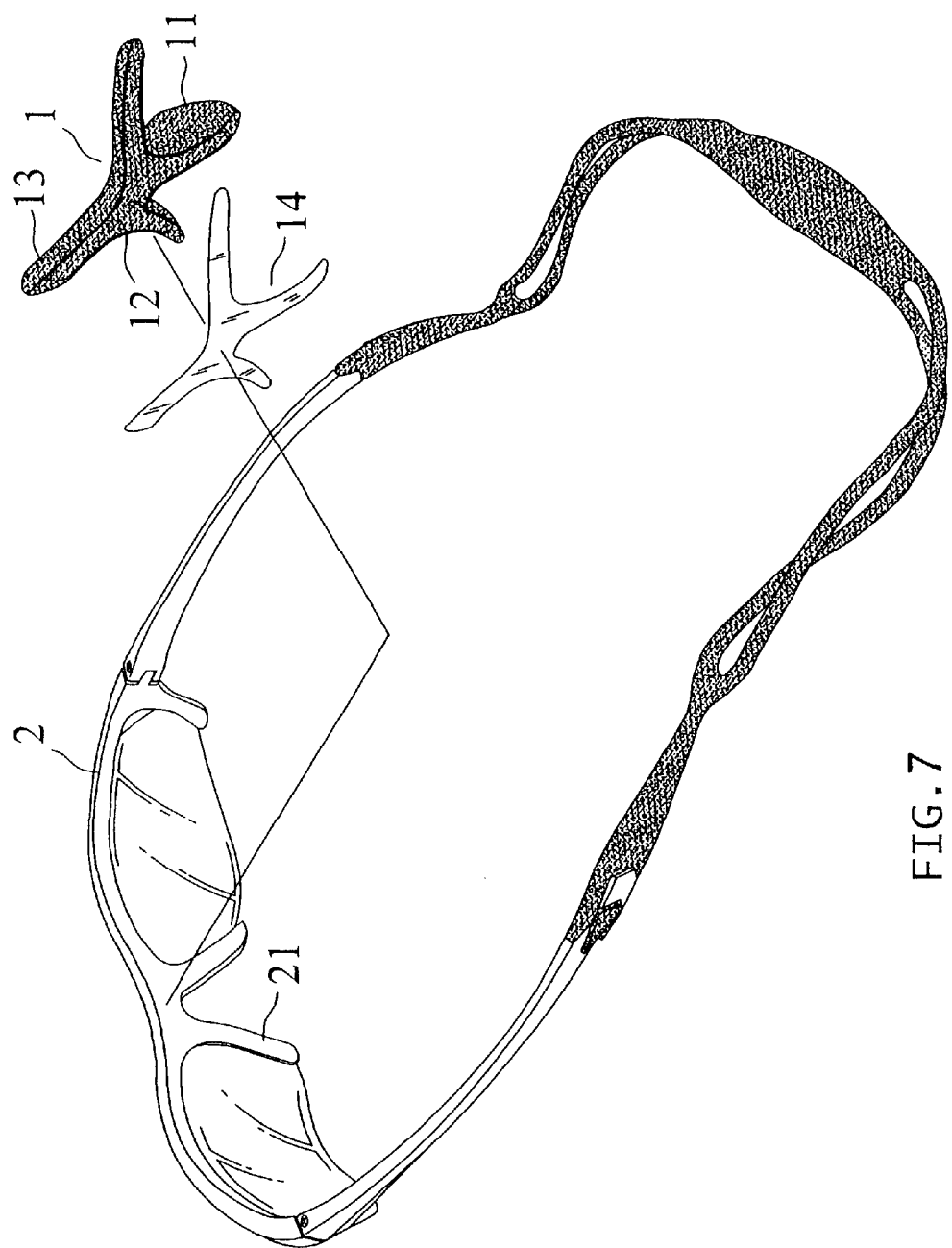
FIG. 7 is a perspective view, partly exploded, of a pair of goggles with another modified embodiment of the nose pad in accordance with the present invention.

FIG. 7 illustrates another modified embodiment of the invention, wherein the frame 2 of the pair of goggles has no peg 22. Further, a film 14 is adhered between the inner side of the intermediate section 21 of the frame 2 and the front side of the nose pad 1 to seal the recessed portion 11.

The nose pad 1, 1A in accordance with the present invention provides an air cushioning effect to avoid injury to the wearer when the pair of goggles or eyeglasses is impacted. Further, the nose pad 1, 1A provides improved wearing comfort by the recessed portion 12 that receives air. Further, the air in the recessed portion 12 provides the pair of goggles or eyeglasses with buoyancy, preventing loss of the goggles or eyeglasses when the wearer is taking water activities.

Although specific embodiments have been illustrated and described, numerous modifications and variations are still possible without departing from the essence of the invention. The scope of the invention is limited by the accompanying claims.

What is claimed is:

1. A nose pad for a pair of goggles or eyeglasses, the nose pad being mounted to an inner side of an intermediate section of a frame of the pair of goggles or eyeglasses, the nose pad comprising a perimeter wall extending along a perimeter thereof, the perimeter wall extending forward to define a recessed portion for receiving air.

2. The nose pad as claimed in claim 1 further comprising a film adhered to a front side of the nose pad to seal the recessed portion.

3. The nose pad as claimed in claim 1 wherein the nose pad includes a lengthened top side.

4. The nose pad as claimed in claim 1 wherein the recessed portion includes an opening facing forward.

5. A pair of goggles comprising:
   a frame including an intermediate section with an inner side; and
   a nose pad attached to the inner side of the intermediate section of the frame, the nose pad comprising a perimeter wall extending along a perimeter thereof, the perimeter wall extending forward to define a recessed portion for receiving air.

6. The pair of goggles as claimed in claim 5 further comprising a film adhered between the inner side of the intermediate section of the frame and a front side of the nose pad to seal the recessed portion.

7. The pair of goggles as claimed in claim 5 wherein the nose pad includes a lengthened top side.

8. The pair of goggles as claimed in claim 5 wherein the recessed portion includes an opening facing forward, and wherein the opening is closed by the inner side of the intermediate section of the frame.

9. The pair of goggles as claimed in claim 5 wherein the inner side of the intermediate section of the frame includes a plurality of pegs and wherein the nose pad includes a plurality of engaging holes for engaging with the pegs.

* * * * *